(12) United States Patent
Qian et al.

(10) Patent No.: US 8,908,754 B1
(45) Date of Patent: Dec. 9, 2014

(54) DECISION FEEDBACK EQUALIZATION FOR SIGNALS HAVING UNEQUALLY DISTRIBUTED PATTERNS

(71) Applicant: Marvell International Ltd., Hamilton (BM)

(72) Inventors: Haoli Qian, Fremont, CA (US); Xing Wu, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/966,753

(22) Filed: Aug. 14, 2013

Related U.S. Application Data

(63) Continuation of application No. 12/269,744, filed on Nov. 12, 2008, now Pat. No. 8,542,725.

(60) Provisional application No. 60/987,916, filed on Nov. 14, 2007.

(51) Int. Cl.
  *H03H 7/40* (2006.01)
  *H04L 25/03* (2006.01)

(52) U.S. Cl.
  CPC ............... *H04L 25/03885* (2013.01)
  USPC ........................................... 375/233; 375/229

(58) Field of Classification Search
  USPC ................. 375/260, 285, 229–236, 346, 350; 708/322–323
  See application file for complete search history.

(56) References Cited

U.S. PATENT DOCUMENTS

| | | |
|---|---|---|
| 4,449,190 A | 5/1984 | Flanagan et al. |
| 5,134,633 A | 7/1992 | Werner |
| 5,245,704 A | 9/1993 | Weber et al. |
| 5,623,474 A * | 4/1997 | Oshio et al. ............... 369/47.15 |
| 5,650,860 A | 7/1997 | Uz |
| 5,778,029 A | 7/1998 | Kaufmann |
| 5,930,299 A | 7/1999 | Vannatta et al. |
| 6,031,628 A | 2/2000 | Jacob et al. |
| 6,222,889 B1 | 4/2001 | Lee |
| 6,255,906 B1 | 7/2001 | Eidson et al. |
| 6,266,517 B1 | 7/2001 | Fitzpatrick et al. |
| 6,275,685 B1 | 8/2001 | Wessel et al. |
| 6,639,944 B1 | 10/2003 | De Haan et al. |
| 6,667,659 B2 | 12/2003 | Stengel et al. |
| 6,731,406 B1 | 5/2004 | Ganapathy et al. |
| 6,829,313 B1 | 12/2004 | Xu |
| 6,912,249 B2 * | 6/2005 | Haartsen ....................... 375/231 |
| 6,950,469 B2 | 9/2005 | Karczewicz et al. |

(Continued)

OTHER PUBLICATIONS

"Advisory Action", U.S. Appl. No. 11/945,151, (Nov. 22, 2010), 3 pages.

(Continued)

*Primary Examiner* — Sam K Ahn
*Assistant Examiner* — Janice Tieu

(57) ABSTRACT

Tools capable of improving the accuracy of decision feedback equalization (DFE) are described. The tools may adapt a DFE using a more-equal distribution of signals than those actually received. The tools may do so by disregarding, averaging, or weighting certain signals when adapting the DFE when those signals represent an unequal distribution of bit patterns. In one example, the tools detect and disregard some of the signals representing idle bit patterns that are received more often than other bit patterns. The tools may also or instead compensate for a bit pattern that is never or rarely received.

20 Claims, 6 Drawing Sheets

(56) References Cited

U.S. PATENT DOCUMENTS

| | | | |
|---|---|---|---|
| 6,983,026 B2 | 1/2006 | Pinckley et al. |
| 7,023,941 B1 | 4/2006 | Rey et al. |
| 7,173,992 B2 | 2/2007 | Frigon |
| 7,180,901 B2 | 2/2007 | Chang et al. |
| 7,200,799 B2 | 4/2007 | Wang et al. |
| 7,213,194 B2 | 5/2007 | Nieminen |
| 7,218,786 B2 | 5/2007 | Lin |
| 7,262,722 B1 | 8/2007 | Jahanghir et al. |
| 7,362,818 B1 | 4/2008 | Smith et al. |
| 7,418,057 B2 | 8/2008 | Shako et al. |
| 7,447,274 B2 | 11/2008 | Shako et al. |
| 7,450,641 B2 | 11/2008 | Sun et al. |
| 7,466,762 B2 | 12/2008 | Shako et al. |
| 7,532,590 B2 | 5/2009 | Ok et al. |
| 7,599,431 B1 | 10/2009 | Anderson et al. |
| 7,675,886 B2 | 3/2010 | Agrawal et al. |
| 7,684,627 B2 | 3/2010 | Ranganathan |
| 7,702,020 B2 | 4/2010 | Gallant et al. |
| 7,706,475 B1 | 4/2010 | Kopikare et al. |
| 7,782,951 B2 | 8/2010 | Muthukrishnan et al. |
| 7,782,973 B2 | 8/2010 | Kim et al. |
| 7,822,147 B2 | 10/2010 | Huang et al. |
| 7,965,710 B1 | 6/2011 | Choi et al. |
| 7,969,964 B2 | 6/2011 | Kim et al. |
| 7,991,063 B2 | 8/2011 | Khan et al. |
| 8,014,737 B2 | 9/2011 | Pratt et al. |
| 8,059,588 B2 | 11/2011 | Sood |
| 8,059,630 B2 | 11/2011 | Prateek |
| 8,160,150 B2 | 4/2012 | Moore |
| 8,223,872 B1 | 7/2012 | Zhang et al. |
| 8,311,031 B2 | 11/2012 | Kim et al. |
| 8,345,533 B1 | 1/2013 | Zhao |
| 8,345,714 B2 | 1/2013 | Ryu et al. |
| 8,442,107 B2 | 5/2013 | Cho et al. |
| 8,498,342 B1 | 7/2013 | Sha et al. |
| 8,520,771 B1 | 8/2013 | Brunn et al. |
| 8,542,571 B2 | 9/2013 | Kim et al. |
| 8,542,725 B1 | 9/2013 | Qian et al. |
| 8,565,325 B1 | 10/2013 | Banerjea |
| 8,576,830 B2 | 11/2013 | Swarts et al. |
| 8,614,994 B2 | 12/2013 | Swarts et al. |
| 8,681,730 B2 | 3/2014 | Swarts et al. |
| 8,681,893 B1 | 3/2014 | Brunn et al. |
| 8,761,261 B1 | 6/2014 | Wang |
| 8,817,771 B1 | 8/2014 | Zhao et al. |
| 2002/0053058 A1 | 5/2002 | Lee et al. |
| 2002/0067773 A1 | 6/2002 | Jackson et al. |
| 2002/0072346 A1 | 6/2002 | Kato et al. |
| 2003/0098804 A1 | 5/2003 | Ekstrand et al. |
| 2003/0108135 A1 | 6/2003 | Frigon |
| 2003/0126551 A1 | 7/2003 | Mantha et al. |
| 2003/0164736 A1 | 9/2003 | Stengel et al. |
| 2003/0179831 A1 | 9/2003 | Gupta et al. |
| 2004/0090909 A1 | 5/2004 | Khlat |
| 2004/0141525 A1 | 7/2004 | Bhushan et al. |
| 2004/0148546 A1 | 7/2004 | Meyer et al. |
| 2004/0223473 A1 | 11/2004 | Ha et al. |
| 2004/0232984 A1 | 11/2004 | Meade et al. |
| 2005/0018519 A1 | 1/2005 | Nii |
| 2005/0213661 A1 | 9/2005 | Xiang et al. |
| 2005/0231292 A1 | 10/2005 | Akahori et al. |
| 2005/0243946 A1 | 11/2005 | Chung et al. |
| 2005/0276266 A1 | 12/2005 | Terry |
| 2006/0084389 A1 | 4/2006 | Beale et al. |
| 2006/0126962 A1 | 6/2006 | Sun |
| 2006/0174236 A1 | 8/2006 | Stein et al. |
| 2006/0227895 A1 | 10/2006 | Booth et al. |
| 2007/0016838 A1 | 1/2007 | Mielczarek et al. |
| 2007/0025448 A1 | 2/2007 | Cha et al. |
| 2007/0086528 A1 | 4/2007 | Mauchly et al. |
| 2007/0092013 A1 | 4/2007 | Cahn et al. |
| 2007/0118791 A1 | 5/2007 | Hepler et al. |
| 2007/0135065 A1 | 6/2007 | Leffel et al. |
| 2007/0241812 A1 | 10/2007 | Yang et al. |
| 2008/0031376 A1 | 2/2008 | Ban |
| 2008/0040411 A1 | 2/2008 | Stojancic et al. |
| 2008/0043702 A1 | 2/2008 | Moon et al. |
| 2008/0049709 A1 | 2/2008 | Pan et al. |
| 2008/0074289 A1 | 3/2008 | Sauder et al. |
| 2008/0089282 A1 | 4/2008 | Malladi et al. |
| 2008/0090583 A1 | 4/2008 | Wang et al. |
| 2008/0094280 A1 | 4/2008 | Fenton |
| 2008/0123515 A1 | 5/2008 | Boehlke et al. |
| 2008/0219373 A1 | 9/2008 | Zhang et al. |
| 2008/0247467 A1 | 10/2008 | Rusanovskyy et al. |
| 2008/0270344 A1 | 10/2008 | Yurick et al. |
| 2008/0279322 A1 | 11/2008 | Franovici et al. |
| 2009/0003472 A1 | 1/2009 | Dent |
| 2009/0086820 A1 | 4/2009 | Hong et al. |
| 2009/0097533 A1 | 4/2009 | Lakkis |
| 2009/0103622 A1 | 4/2009 | Tripathi et al. |
| 2009/0154557 A1 | 6/2009 | Zhao et al. |
| 2009/0181622 A1 | 7/2009 | Hardacker |
| 2009/0213946 A1 | 8/2009 | Dick et al. |
| 2009/0257526 A1 | 10/2009 | Wang et al. |
| 2009/0310704 A1 | 12/2009 | Jethanandani et al. |
| 2010/0035554 A1 | 2/2010 | Ba et al. |
| 2010/0061306 A1 | 3/2010 | Ryu et al. |
| 2010/0077275 A1 | 3/2010 | Yu et al. |
| 2010/0135257 A1 | 6/2010 | Higuchi et al. |
| 2010/0239034 A1 | 9/2010 | Lee et al. |
| 2011/0007717 A1 | 1/2011 | Swarts et al. |
| 2011/0007718 A1 | 1/2011 | Swarts et al. |
| 2011/0013730 A1 | 1/2011 | Mansson et al. |
| 2013/0021976 A1 | 1/2013 | Yang et al. |
| 2013/0142060 A1 | 6/2013 | Challa et al. |

OTHER PUBLICATIONS

"Advisory Action", U.S. Appl. No. 11/945,183, (Nov. 9, 2010), 2 pages.

"Final Office Action", U.S. Appl. No. 11/945,151, (Aug. 26, 2011), 20 pages.

"Final Office Action", U.S. Appl. No. 11/945,151, (Sep. 10, 2010), 27 pages.

"Final Office Action", U.S. Appl. No. 11/945,183, (Sep. 13, 2010), 12 pages.

"Final Office Action", U.S. Appl. No. 12/253,078, (Feb. 13, 2013), 21 pages.

"Final Office Action", U.S. Appl. No. 12/269,744, (Sep. 19, 2012), 13 pages.

"Final Office Action", U.S. Appl. No. 12/397,057, (Feb. 1, 2013), 13 pages.

"Final Office Action", U.S. Appl. No. 12/397,057, (Apr. 27, 2012), 11 pages.

"Final Office Action", U.S. Appl. No. 12/510,716, (Jun. 28, 2012), 10 pages.

"Final Office Action", U.S. Appl. No. 12/511,606, (Sep. 13, 2012), 8 pages.

"Final Office Action", U.S. Appl. No. 12/511,629, (Dec. 7, 2012), 7 pages.

"Final Office Action", U.S. Appl. No. 12/574,879, (Oct. 1, 2013), 9 pages.

"Final Office Action", U.S. Appl. No. 12/574,879, (Nov. 20, 2012), 13 pages.

"Non-Final Office Action", U.S. Appl. No. 11/945,151, (Mar. 25, 2010), 22 pages.

"Non-Final Office Action", U.S. Appl. No. 11/945,151, (Mar. 28, 2011), 22 pages.

"Non-Final Office Action", U.S. Appl. No. 11/945,183, (Apr. 5, 2010), 8 pages.

"Non-Final Office Action", U.S. Appl. No. 12/253,078, (Jun. 8, 2012), 18 pages.

"Non-Final Office Action", U.S. Appl. No. 12/269,744, (Feb. 16, 2012), 14 pages.

"Non-Final Office Action", U.S. Appl. No. 12/269,744, (Aug. 18, 2011), 10 pages.

"Non-Final Office Action", U.S. Appl. No. 12/397,057, (Nov. 9, 2011), 7 pages.

(56) References Cited

OTHER PUBLICATIONS

"Non-Final Office Action", U.S. Appl. No. 12/397,057, (Aug. 1, 2012), 10 pages.
"Non-Final Office Action", U.S. Appl. No. 12/510,716, (Oct. 23, 2013), 12 pages.
"Non-Final Office Action", U.S. Appl. No. 12/510,716, (Nov. 8, 2011), 8 pages.
"Non-Final Office Action", U.S. Appl. No. 12/511,606, (Aug. 22, 2013), 8 pages.
"Non-Final Office Action", U.S. Appl. No. 12/511,606, (Jan. 4, 2012), 6 pages.
"Non-Final Office Action", U.S. Appl. No. 12/511,629, (Apr. 13, 2012), 6 pages.
"Non-Final Office Action", U.S. Appl. No. 12/540,753, (Apr. 5, 2012), 14 pages.
"Non-Final Office Action", U.S. Appl. No. 12/574,879, (Apr. 23, 2013), 13 pages.
"Non-Final Office Action", U.S. Appl. No. 12/574,879, (Jun. 4, 2012), 11 pages.
"Non-Final Office Action", U.S. Appl. No. 12/767,922, (Nov. 2, 2012), 12 pages.
"Non-Final Office Action", U.S. Appl. No. 13/182,004, (May 21, 2013), 9 pages.
"Non-Final Office Action", U.S. Appl. No. 13/182,004, (Oct. 22, 2013), 14 pages.
"Notice of Allowance", U.S. Appl. No. 11/945,183, (Feb. 23, 2011), 7 pages.
"Notice of Allowance", U.S. Appl. No. 12/269,744, (Apr. 10, 2013), 11 pages.
"Notice of Allowance", U.S. Appl. No. 12/397,057, (May 15, 2013), 7 pages.
"Notice of Allowance", U.S. Appl. No. 12/511,629, (Mar. 28, 2013), 7 pages.
"Notice of Allowance", U.S. Appl. No. 12/540,753, (Aug. 27, 2012), 5 pages.
"Notice of Allowance", U.S. Appl. No. 12/574,879, (Oct. 31, 2013), 7 pages.
"Notice of Allowance", U.S. Appl. No. 12/767,922, (Apr. 16, 2013), 5 pages.
"Part 16: Air Interface for Fixed and Mobile Broadband Wireless Access Systems; Amendment 2: Physical and Medium Access Control Layers for Combined Fixed and Mobile Operation in Licensed Bands", *IEEE Std 802.16e*, (Feb. 28, 2006), 822 pages.
"Part 16: Air Interface for Fixed Broadband Wireless Access Systems", *IEEE Std. 802.16*, (Oct. 1, 2004), 857 pages.
"Restriction Requirement", U.S. Appl. No. 12/269,744, (Jun. 22, 2011), 6 pages.
"Supplemental Notice of Allowance", U.S. Appl. No. 12/269,744, (May 20, 2013), 8 pages.
"Supplemental Notice of Allowance", U.S. Appl. No. 12/269,744, (Jul. 1, 2013), 8 pages.
"Supplemental Notice of Allowance", U.S. Appl. No. 12/269,744, (Aug. 23, 2013), 7 pages.
"Supplemental Notice of Allowance", U.S. Appl. No. 12/397,057, (Aug. 26, 2013), 2 pages.
Mujtaba, Syed A., "TGn Sync Proposal Technical Specification", IEEE 802.11-04 / *Wireless LANs*, (May 2005), pp. 1-131.
Zhang, Hongyuan et al., "U.S. Appl. No. 12/098,222", (Apr. 4, 2008), 78 pages.
"Non-Final Office Action", U.S. Appl. No. 14/058,879, Jan. 31, 2014, 12 pages.
"Non-Final Office Action", U.S. Appl. No. 12/253,078, Nov. 21, 2013, 25 pages.
"Non-Final Office Action", U.S. Appl. No. 13/951,203, Apr. 2, 2014, 4 pages.
"Notice of Allowance", U.S. Appl. No. 12/510,716, Feb. 6, 2014, 6 pages.
"Notice of Allowance", U.S. Appl. No. 13/182,004, Apr. 9, 2014, 7 pages.
"Corrected Notice of Allowance", U.S. Appl. No. 12/253,078, Jul. 25, 2014, 6 pages.
"Final Office Action", U.S. Appl. No. 14/058,879, Jul. 15, 2014, 13 pages.
"Notice of Allowance", U.S. Appl. No. 12/253,078, Jun. 20, 2014, 8 pages.
"Notice of Allowance", U.S. Appl. No. 13/951,203, Jul. 31, 2014, 6 pages.
"Non-Final Office Action", U.S. Appl. No. 14/095,021, Oct. 1, 2014, 9 pages.
"Notice of Allowance", U.S. Appl. No. 13/964,376, Sep. 11, 2014, 11 pages.
"Notice of Allowance", U.S. Appl. No. 14/058,879, Sep. 23, 2014, 11 pages.

\* cited by examiner

| Record | 118 |
|---|---|
| 10000 | 1 |
| 10001 | 1 |
| 10010 | 1 |
| 10100 | 0 |
| 11000 | 1 |
| 10011 | 0 |
| 10101 | 0 |
| 11001 | 0 |
| 10110 | 0 |
| 11010 | 1 |
| 11100 | 0 |
| 10111 | 0 |
| 11011 | 0 |
| 11101 | 0 |
| 11110 | 0 |
| 11111 | 0 |

Bit Patterns

Has Been ("1") or Has Not Been ("0") Used

Fig. 4

DECISION FEEDBACK EQUALIZATION FOR SIGNALS HAVING UNEQUALLY DISTRIBUTED PATTERNS

RELATED APPLICATION

This application is a continuation of and claims priority to U.S. Utility patent application Ser. No. 12/269,755 which in turn claims priority to U.S. Provisional Patent Application Ser. No. 60/987,916 filed Nov. 14, 2007, entitled "Methods of DFE Adaptation Protection Against Colored Patterns" to Haoli Qian and Xing Wu, the disclosure of which is incorporated by reference herein in its entirety.

BACKGROUND

Decision Feedback Equalization (DFE) equalizes signal loss and interference on a signal. This signal loss and interference is often caused by a channel between the source of the signal and the receiver of that signal.

Not only may a channel cause signal loss and interference, this loss and interference may be different for different channels, change for a particular channel, and depend on the transmission rate of the signal. In part because of this, a particular equalization cannot accurately be set without taking into account the particular channel or, even for a particular channel, without an ability to change in response to changes in the loss or interference caused by that channel. DFE addresses this by making decisions about how to equalize loss and interference based on the signals received from the source and through the channel (this is a type of feedback). In effect, DFE continues to adapt based on the signals received to take into account the particular channel and changes to that channel.

A DFE's ability to accurately equalize for loss or interference depends on the signal's randomness. A random signal, also called a white signal, is one that has or can be closely approximated to have a random distribution of frequencies within a frequency band at which the signal is transmitted. Conversely, a non-random signal is typically referred to as a colored signal. A DFE is less accurate for a colored signal in part because the color of the signal may be confused with loss or interference caused by the channel.

Many signals transmitted today—especially those transmitted at comparatively high data-transmission rates—are not simply white signals. They are colored signals. As noted above, the more colored a signal, the less accurate current DFEs may equalize that signal.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

In some embodiments a method, computer-readable media, and/or system is described that acts or is capable of receiving signals each of which represents one of multiple possible bit patterns, the signals being received through a channel that causes amplitude loss or interference when passing through the channel. It may also determine, for each of the signals, which bit pattern of the multiple possible bit patterns each of the signals represents, the bit patterns of the signals being unequally distributed among the multiple possible bit patterns, after which it may retain a record of one or more of the received signals based on their respective bit patterns. It may also adapt equalizing coefficients using the record and based on a more-equal distribution of the multiple possible bit patterns than the unequally distributed bit patterns of the signals, the adapted equalizing coefficients capable of correcting, at least in part, the amplitude loss or the interference of the signals or new signals.

In other embodiments, a method, computer-readable media, system, and/or DFE engine is described that acts or is capable of receiving a signal having a bit pattern when received via a channel, the signal having amplitude loss across frequencies of a frequency band of the signal or interference caused when the signal passed through the channel. It may also determine, for the signal, the bit pattern that the signal represents and determine that the bit pattern for the signal has or has not been used to adjust one or more equalizing coefficients a predetermined number of times. It may then disregard the signal responsive to determining that the bit pattern has been used, or adjust the one or more equalizing coefficients responsive to determining that the bit pattern has not been used to adjust the one or more equalizing coefficients the predetermined number of times.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 4 is an illustration of the record of FIG. 1 having 16 possible bit patterns toggled to 1 or remaining at 0 based on whether or not a signal representing the bit patterns has been used to adapt DFE coefficients.

DETAILED DESCRIPTION

Overview

As noted in the Background above, many signals transmitted today are colored signals. One example of this color is an unequal distribution of signals, the signals representing various bit patterns, and thus the color of the signals represents an unequal distribution of bit patterns. As noted above, the more colored a signal, the less accurately current DFEs may equalize that signal.

Various coding protocols are currently used that contribute to this unequal distribution of bit patterns. Some of these protocols limit the run length of bit patterns, sometimes called run-length-limited codes, which can make signals colored by limiting the type of bit patterns. Some of these run-lengthlimited codes do not permit a signal to be sent that represents a bit pattern having six or more zeros or ones in a row. Some of these protocols send idle bit patterns, which contribute to unequal bit pattern distribution because the idle bit pattern is often sent much more often than any of the other bit patterns. And some of these protocols send special code-word bit patterns that are more or less common than other bit patterns. Some coding protocols currently used for high-data-transmission rates (e.g., the 8b/10b line code) use all three of these contributors to unequal bit pattern distribution.

The following document describes tools capable of improving the accuracy of decision feedback equalization (DFE). The tools may adapt a DFE using a more-equal distribution of signals than those actually received. The tools may do so by disregarding, averaging, or weighting certain signals when adapting the DFE when those signals represent an unequal distribution of bit patterns. In one example, the tools detect and disregard some of the signals representing idle bit patterns that are received more often than other bit patterns. The tools may also or instead compensate for a bit pattern that is never or rarely received.

In the discussion that follows, an example operating environment is described that may incorporate, represent, or be used by the tools. Example procedures are also described that may be employed in the example operating environment as well as other environments. In the discussion below, reference will be made to the environment by way of example only. Therefore, implementation of the tools is not limited to the example environment. The term tools as used herein may refer to system(s), method(s), integrated circuit(s), various other hardware, computer-readable and/or executable instructions, and/or technique(s) as permitted by the context above and throughout the document.

Example Operating Environment

Figure 1:
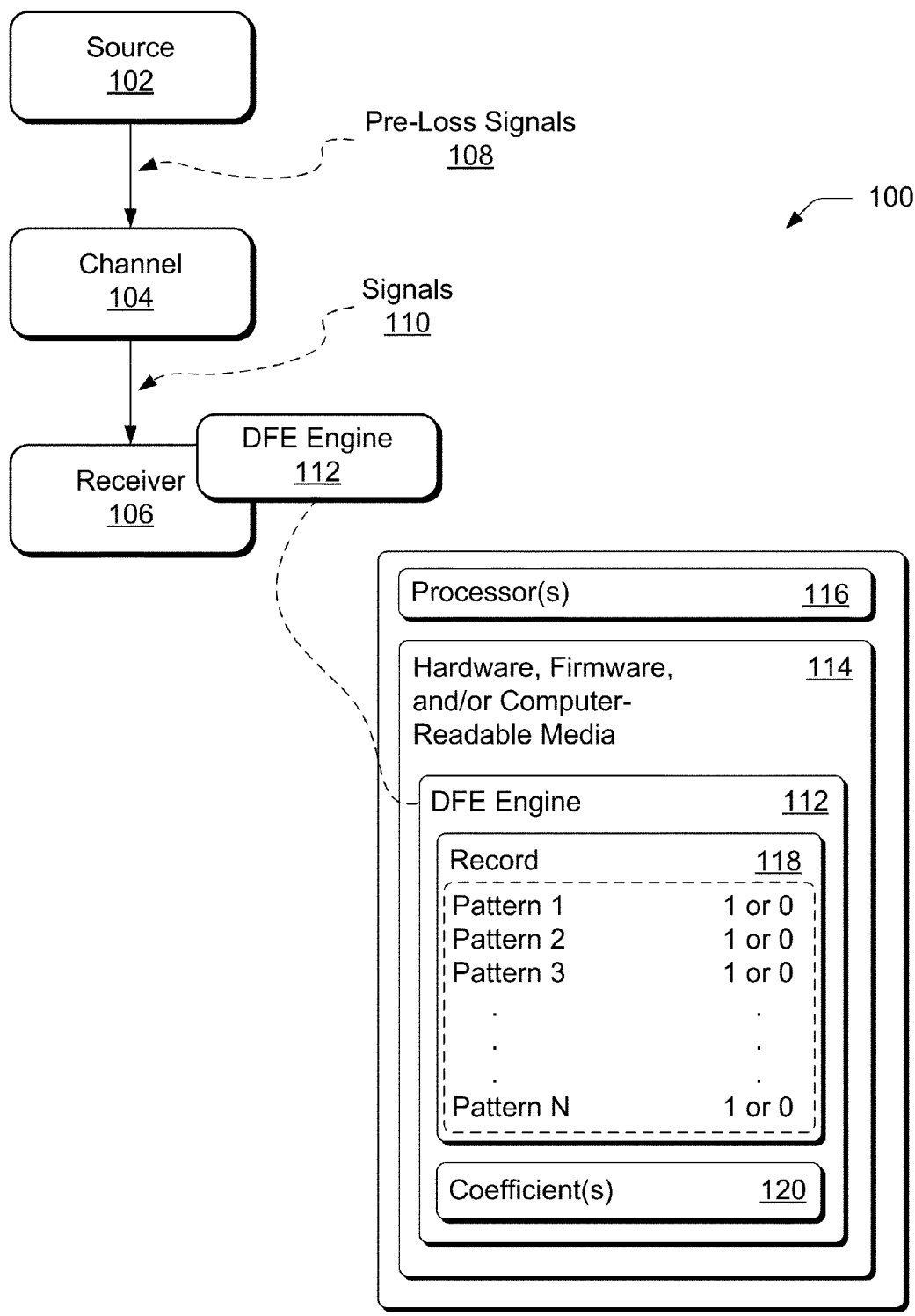
FIG. 1 is an illustration of an example operating environment that includes a source of a signal, a channel through which the signal passes, a receiver that receives the signal, and a decision feedback equalization engine.

FIG. 1 illustrates one such operating environment generally at 100. The example operating environment includes a source 102, a channel 104, and a receiver 106. The source produces, directly or indirectly from some previous source, pre-loss signals 108. The pre-loss signals are colored and represent bit patterns of unequal distribution that have not experienced loss or interference from channel 104, though they may have loss or interference from some other channel or cause. These pre-loss signals 108 are passed through channel 104. Channel 104 alters the pre-loss signals such that they include loss and/or interference, thereby transmitting signals 110.

This loss may be an unequal amplitude loss, such as high amplitude loss at particular frequencies (e.g., at or near the maximum frequency of the signal, also called the Nyquist frequency). The interference may include inter-symbol interference common to high data-transmission rates or other interference. The loss or interference is caused at least in part by the channel and may change over time as well. Temperature changes to the channel, data-transmission rate changes, and other protocol or environmental factors may affect the loss or interference between the source and receiver.

Signals 110 are received by receiver 106, either directly, or indirectly from DFE engine 112. DFE engine 112 may be integral with or separate from receiver 106. The DFE engine is capable of using a more-equal distribution of signals to equalize current or future signals than those actually received (i.e., signals 110).

The DFE engine may be implemented in hardware, firmware, and/or computer-readable media and may be digital, analog, or a combination of these. As shown in FIG. 1, DFE engine 112 is comprised by hardware, firmware, and/or computer-readable media 114. If the engine includes or relies on computer-readable media, processors 116 are included in communication with the computer-readable media and capable of executing instructions (e.g., those of the DFE engine) stored on the computer-readable media.

The DFE engine may include or have access to a record 118. The DFE engine may use this record to track bit patterns so that the engine may adapt its equalizing coefficients 120 based on a more-equal distribution of signals than those actually received. The record may retain bit pattern occurrences (here bit patterns from 1 to N) and signals or information about the signals representing those bit patterns. The record may record that a particular bit pattern has two signals received for it and information about those two signals sufficient to adapt the equalizing coefficients to correct loss and/or interference in those signals, future signals, and other signals.

Equalizing coefficients 120 include one or more parameters, numbers, or equations with which the DFE engine may correct for loss and/or interference of signals 110.

As shown in FIG. 1, the record may indicate signals representing bit patterns that have been used by the DFE engine to adapt its equalizing coefficients and those signals representing bit patterns that have not been used or have not been used recently. Various ways in which the record may be used are set forth in greater detail below.

Example Procedures

The following discussion describes decision feedback equalization techniques for signals having unequally distributed patterns. These techniques may be implemented utilizing the previously described environment or in other manners. Aspects of the procedure may be implemented in hardware, firmware, or software, or a combination thereof. The procedures are shown as a set of blocks that specify operations performed by one or more entities and are not necessarily limited to the orders shown for performing the operations by the respective blocks.

First Example Procedure

Figure 2:
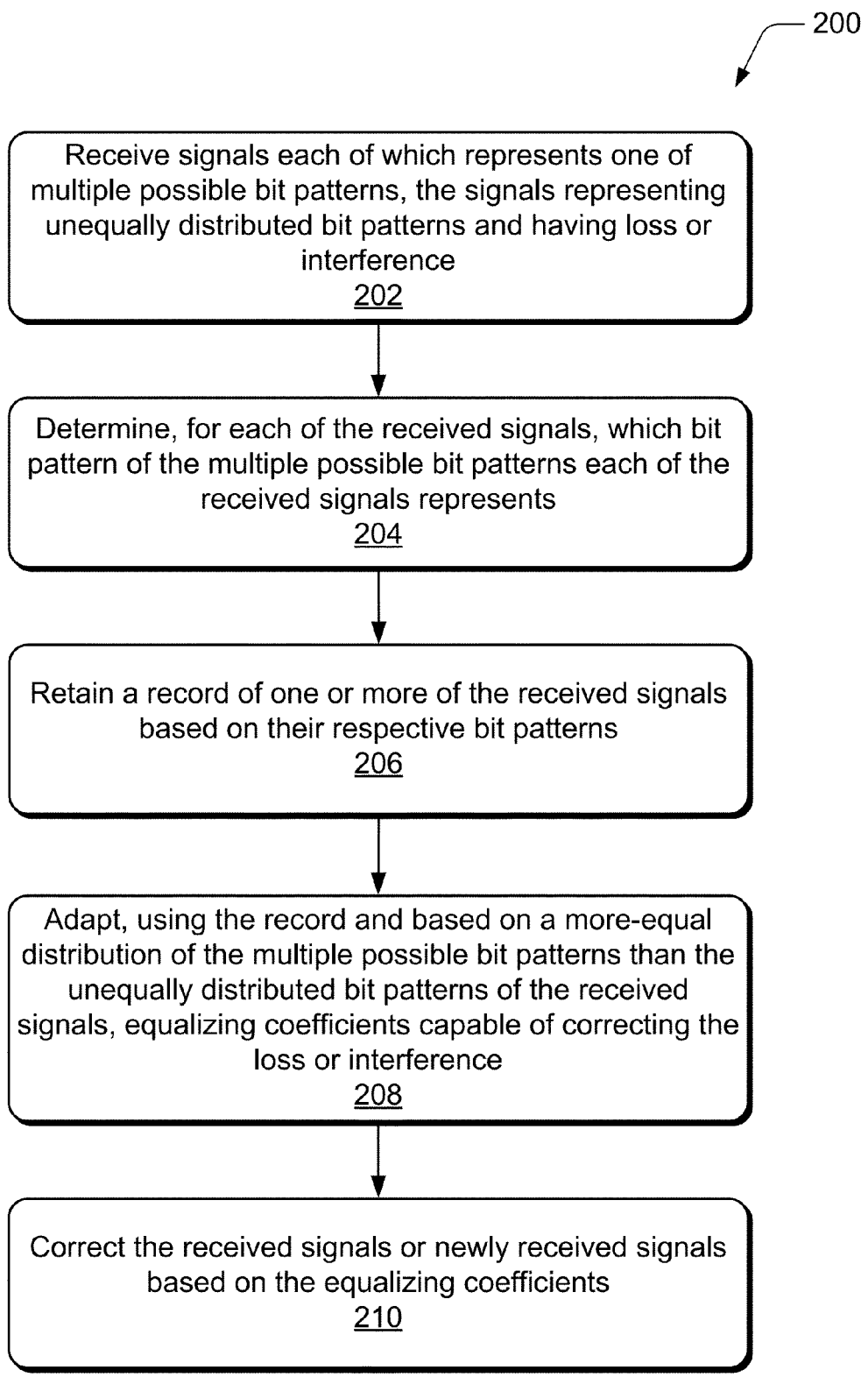
FIG. 2 is a flow diagram depicting an example procedure for decision feedback equalization (DFE) for signals having unequally distributed patterns.

FIG. 2 depicts a procedure 200 in an example implementation of decision feedback equalization (DFE) for signals having unequally distributed patterns.

Block 202 receives signals each of which represents one of multiple possible bit patterns. As noted in part above, the received signals can be received from a source and through a channel and have loss, interference, or both from the channel. This loss may include an unequal amplitude loss across frequencies of a frequency band of the received signals. This interference may include inter-symbol or other types of interference.

By way of example, consider a case where these multiple possible bit patterns are restricted to 16 bit patterns by a run-length-limited code having a maximum length of 5 bits where the first bit set to 1:

Bit Patterns
10000
10001
10010
10100
11000
10011
10101
11001
10110
11010

Each of these received signals should represent one of these 16 possible bit patterns. Block 204 determines, for each of the received signals, which bit pattern of the multiple possible bit patterns each of the received signals represents. As noted above, the received signals are those that have been passed through a channel and therefore have experienced loss and/or interference. These signals, however, are similar to the pre-loss signals of FIG. 1 in that they represent bit patterns that are unequally distributed (e.g., over an arbitrary period of time in which the received signals are received).

Block 206 retains a record of one or more of the received signals based on their respective bit patterns. The tools may act to determine which signals represent which bit patterns and record this in record 118. Assume, for the ongoing example, that 38 signals have been received and determined to represent the following unequal distribution of bit patterns:

| Bit Pattern | Occurrences (of 38 Received) |
|---|---|
| 10000 | 0 |
| 10001 | 4 |
| 10010 | 2 |
| 10100 | 1 |
| 11000 | 2 |
| 10011 | 6 |
| 10101 | 0 |
| 11001 | 1 |
| 10110 | 1 |
| 11010 | 3 |
| 11100 | 2 |
| 10111 | 3 |
| 11011 | 4 |
| 11101 | 3 |
| 11110 | 1 |
| 11111 | 5 |

The tools may act in various ways at this juncture. The tools may make the unequal distribution more-equal but not necessarily perfectly equal by adapting the DFE coefficients to an average of multiple received signals or the first or last of the signals that occurred for each of the bit patterns but without using a signal for a bit pattern that has not yet been received. Or the tools may wait until at least one signal for each bit pattern is received for an equal distribution. Or the tools may use a previously stored signal for a bit pattern for which a newer signal has not been received.

By way of example, consider a case where the tools record the signal for each of multiple occurrences of a particular bit pattern and weight those signals. In this case the tools may average the signals of 10001 so that the four occurrences of this bit pattern are weighted the same as the single occurrence of 11001 and 10110. In another example of the tools set forth in FIG. 3, the tools use the first occurrence and disregarding all other occurrences until at least one of all possible bit patterns has been used to adapt the DFE coefficients. This will be described in more detail following procedure 200.

The tools may also have a waiting period or maximum number of received signals before the tools proceed to adapt the DFE coefficients even if one or some of the possible bit patterns have not been received. Thus, the tools may determine or be pre-set to weigh the negative consequences of not adapting the DFE coefficients quickly with the possible inaccuracies of weighting the DFE coefficients with a more-equal but not entirely equal distribution of bit patterns. The tools may also record the prior signal or signals for a bit pattern and use that signal to adapt the DFE coefficients if the pre-set waiting period or number of signals received are met before another signal representing that bit pattern is received.

In the ongoing example the tools record all of the signals for each occurrence of the bit pattern and average each new signal for a particular bit pattern with the prior signals received for that bit pattern. The tools may also weigh the newest signal for a bit pattern heavier than older signals. Thus, if three signals are received, the first would start with a full weight of 1. The second would be averaged with the first so that both would have a half weight. The third would be averaged with the first two so that the first and second would have quarter weight and the third would have a half weight. Many other weighting techniques are contemplated herein, including those apparent to one skilled in the art of averaging, statistics, or weightings.

In the ongoing example, the tools continue to receive signals until at least one signal for each possible bit pattern is received. Continuing with the 38 signals received and noted above, assume that the tools continue to receive signals until 47 total signals are received before there is at least one signal for each bit pattern. Thus, the record may look like this:

| Bit Pattern | Occurrences (of 47 Received) |
|---|---|
| 10000 | 1 |
| 10001 | 4 |
| 10010 | 2 |
| 10100 | 3 |
| 11000 | 2 |
| 10011 | 6 |
| 10101 | 1 |
| 11001 | 3 |
| 10110 | 1 |
| 11010 | 5 |
| 11100 | 2 |
| 10111 | 3 |
| 11011 | 4 |
| 11101 | 4 |
| 11110 | 1 |
| 11111 | 5 |

At this point the tools proceed to block 208. Block 208 adapts, based on the record, equalizing coefficients capable of equalizing at least in part loss or interference in the received signals or new signals. These coefficients may be used to correct, at least in part, the above-noted unequal amplitude loss of received signals, inter-symbol interference, and/or other losses or interferences caused by the channel or otherwise. Block 208 adapts the DFE coefficients using a more-equal distribution of bit patterns than those received. As noted, this can be done by ignoring some bit patterns, using older bit patterns, decreasing the weight of repetitive bit patterns, or the like. This may effectively de-colorize or randomize the signals by reducing or removing unequal distribution of bit patterns represented in the signals received.

In another particular example, the tools receive a predetermined or determine the set of bit patterns that may be received, and retain in the record an equal number of signals for each bit pattern of the set. If predetermined or even determined by the tools, the set of bit patterns may be dictated by a protocol as mentioned above. This protocol may limit the set of bit patterns possible with run-length-limits, idle bit patterns, special code-word bit patterns, or in other manners. The protocols may exclude bit patterns, such as the 8b/10b line code excluding AKR idle bit patterns. The tools may determine the possible bit patterns based on the protocol being used, such as if the signals indicate this protocol through their structure or special code-word bit patterns.

Block 210 corrects the received signals or new signals based on the equalizing coefficients. In so doing the tools may correct for loss and/or interference of a channel even if the signals received are colored, whether by run length limits (noted in the example above), idle bit patterns, special code-word bit patterns, or otherwise. This equalizing may be effective to correct, at least in part, an unequal amplitude loss and/or inter-symbol interference caused by a channel through which the received signals passed.

Optionally, the tools may provide these equalizing coefficients to another entity for that entity to perform the equalizing. In the ongoing example however, DFE engine 112 may perform one, all, or any combination of blocks 202 to 210.

Second Example Procedure

Figure 3:
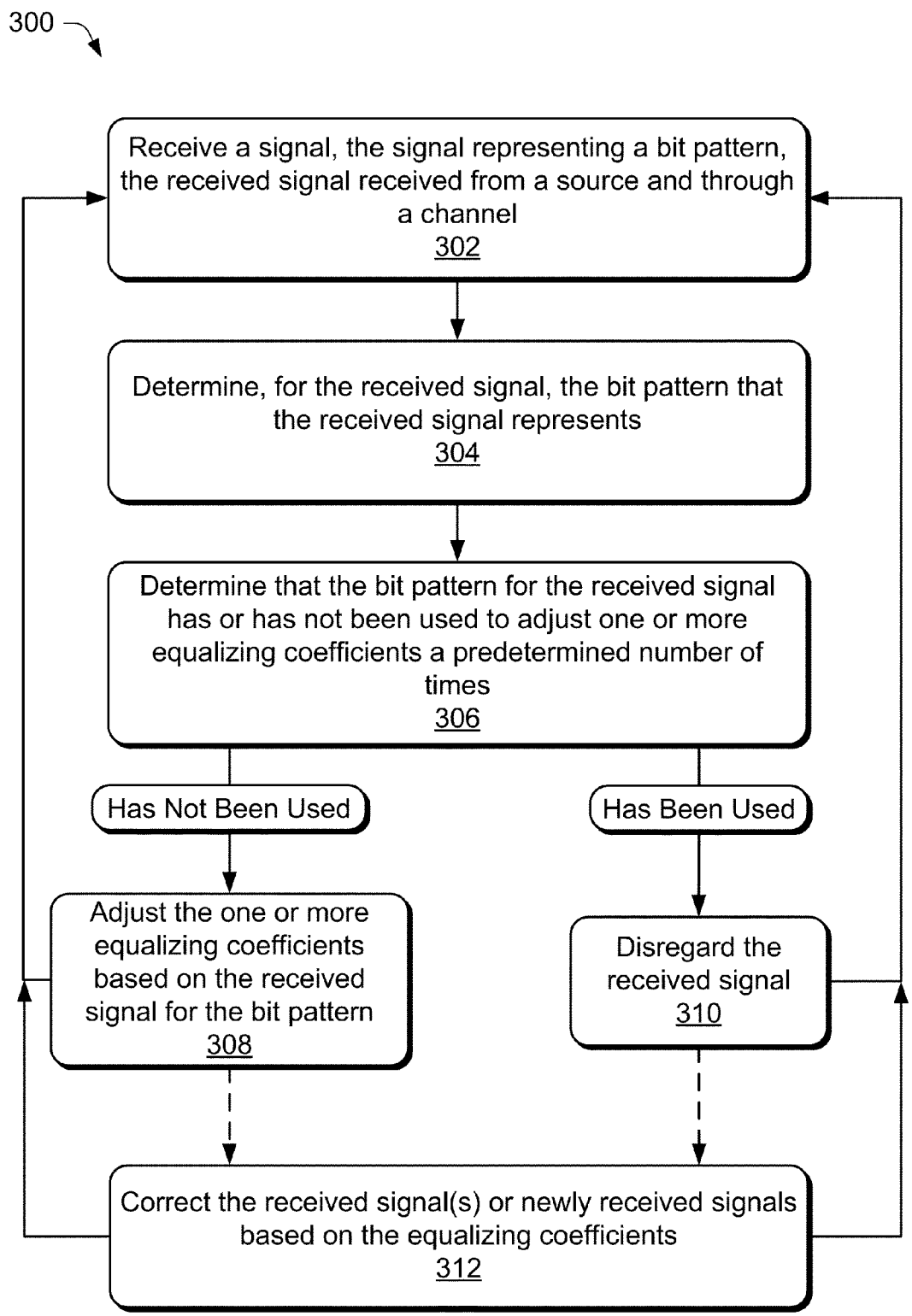
FIG. 3 is a second flow diagram depicting a second example procedure for decision feedback equalization (DFE) for signals having unequally distributed patterns.

FIG. 3 depicts another procedure 300 in an example implementation of decision feedback equalization (DFE) for signals having unequally distributed patterns.

Block 302 receives a signal, the signal representing a bit pattern, the received signal received from a source and through a channel. The received signal may have amplitude loss and interference, such as unequal amplitude loss across frequencies of a frequency band of the received signal and inter-symbol interference, the loss or interference caused when the signal passed through the channel.

Block 304 determines, for the received signal, the bit pattern that the received signal represents after which block 306 determines that the bit pattern for the received signal has or has not been used to adjust one or more equalizing coefficients a predetermined number of times. The predetermined number of times applies to multiple other bit patterns, the bit pattern and the multiple other bit patterns comprised by a discrete set of multiple possible bit patterns capable of being received from the source and through the channel.

This predetermined number may be as little as one and reset to zero responsive to received signals representing all of the multiple possible bit patterns being used once to adjust the one or more equalizing coefficients.

If block 306 determines that the bit pattern for the received signal has not been used the predetermined number of times, the tools proceed to block 308. Otherwise, the tools disregard the signal at block 310 and proceed back to block 302. Alternatively, the tools may first proceed to block 312 after block 310 and before 302 (shown with the dashed arrow).

Block 308 adjusts, responsive to determining that the bit pattern for the received signal has not been used to adjust one or more equalizing coefficients more that a predetermined number of times, the one or more equalizing coefficients based on the received signal for the bit pattern. The tools may proceed to block 312 or back to block 302.

Note that the DFE engine and adaptation of the DFE coefficients may be performed in some cases more quickly and cheaply with a hardware-based and analog DFE engine. In this case the tools, through the DFE engine, may forgo retaining the signal or information about the signal other than to immediately use it to adapt the DFE coefficients. Thus, if the predetermined number is one, the tools may toggle a 1 or 0 in a hardware record for each bit pattern and, once a signal for a particular bit pattern is used to adapt the DFE coefficients, toggle the record to 1. Once all of the bit patterns have been used once the tools can toggle all of the 1s to 0s and start over again. Consider FIG. 4, which shows record 118 of FIG. 1 having certain bit patterns of 16 possible bit patterns toggled to 1 or remaining at 0 based on whether or not a signal representing the bit patterns has been used to adapt the DFE coefficients. In this example received signals representing bit patterns of 10000, 10001, 10010, 11000, and 11010 have been used to adapt the DFE coefficients. If a signal that represents any one of these bit patterns is received before all of the other bit patterns have been used, that signal will be disregarded. Once all of these bit patterns have been used, the tools may toggle all of the 1s back to 0s and start over again. In this example the tools act to make equal the distribution of signals by making equal bit patterns represented by those signals.

Block 312 corrects the received signals or new signals based on the equalizing coefficients. Block 312 may be performed after block 308, after block 310, or at any point in the procedure or even outside of the procedure, such as by some external entity. In the ongoing example, however, the DFE engine continuously adapts the DFE coefficients and continuously equalizes received signals using those coefficients.

Through these and other procedures and techniques contemplated herein, the tools are effective, directly or indirectly, to correct at least in part the loss and/or interference caused by a channel.

Performance Improvement

Figure 5:
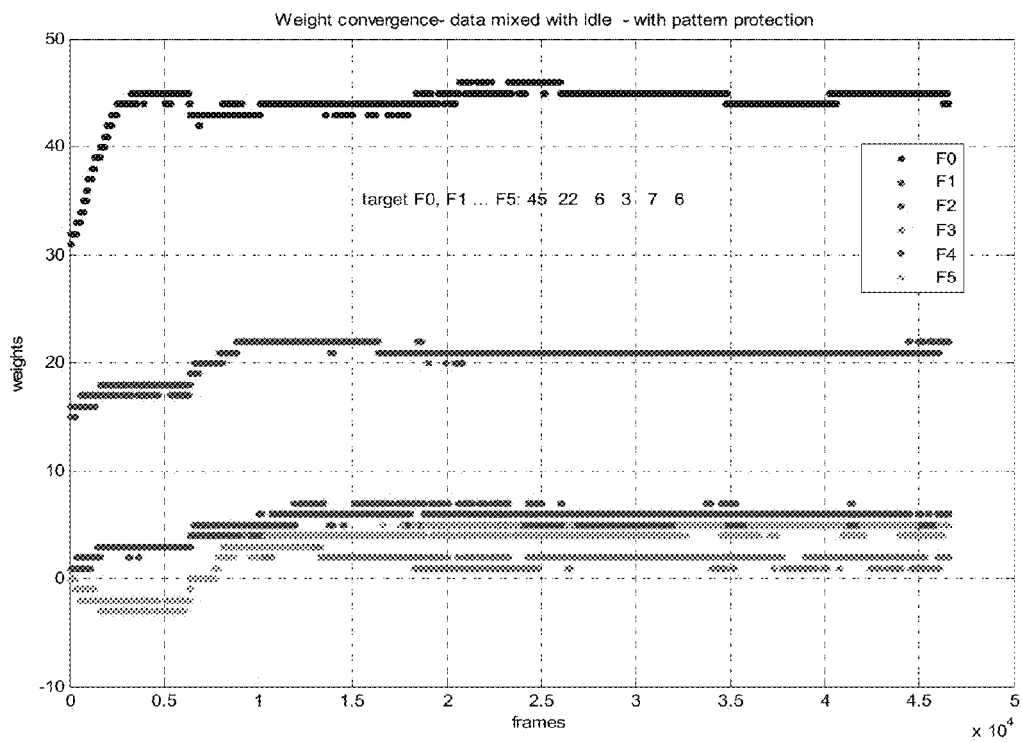
FIG. 5 illustrates a simulation showing good convergence using DFE coefficients resulting from procedure 300 of FIG. 3.
Figure 6:
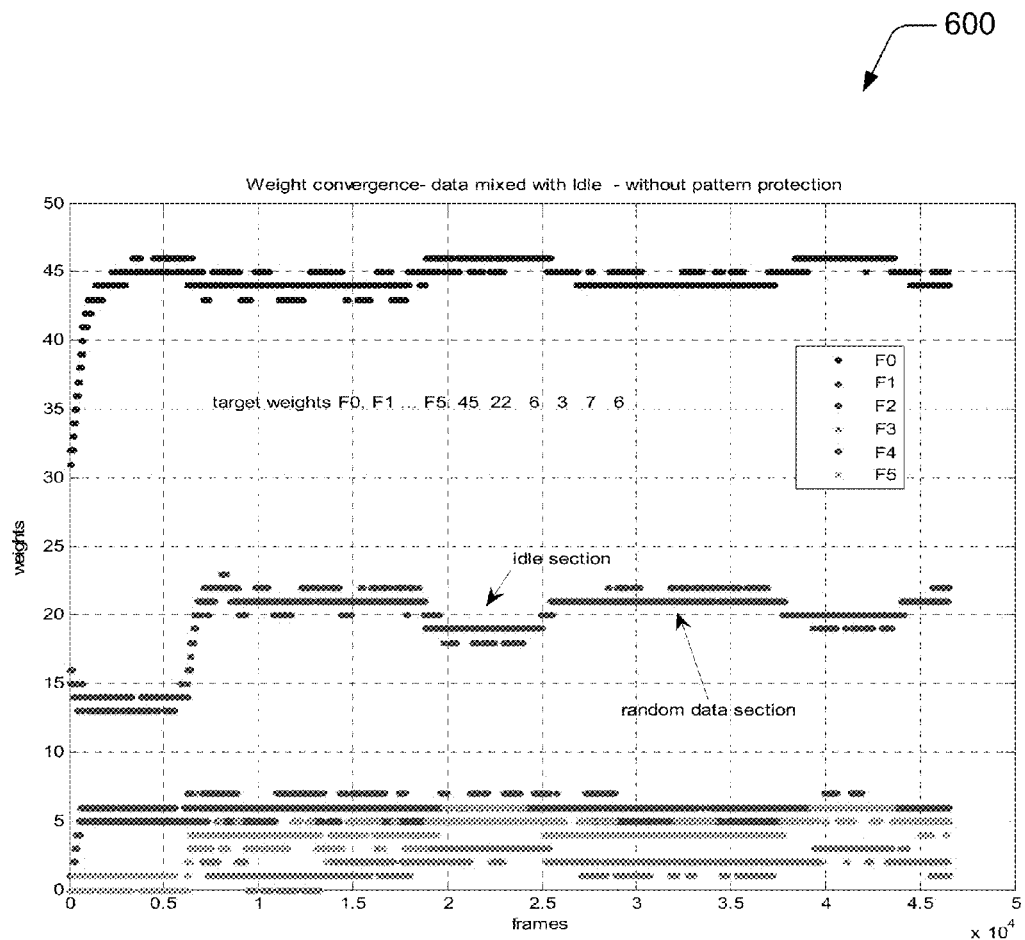
FIG. 6 illustrates a simulation showing convergence inferior to the good convergence of FIG. 5 and not resulting from procedure 300 of FIG. 3.

The following discussion and accompanying FIGS. 5 and 6 describe an example simulated performance improvement when utilizing the procedure 300 of FIG. 3.

The setup for these simulations includes a backplane channel (pre-emphasized with a high-pass feed forward equalization). The simulations simulate a DFE implemented using the procedure of FIG. 3 and a DFE implemented without using the procedures described herein. The pre-loss signals have unequal distributions of bit patterns—they are colored—and have an 8b/10b sequence mixed with idle bit patterns and data bit patterns (like those of the 16 bit patterns mentioned above). The received signals shown are those that have passed through a channel. The target weights are 45, 22, 6, 3, and 7.

FIG. 5 illustrates the simulation at 500 and shows that a DFE, when the tools adapt the DFE coefficients, has good convergence and good recovered pulse response. FIG. 6 illustrates the simulation at 600 showing a DFE when the coefficients are not adapted using the above-described procedures. In this case DFE coefficients do not have good convergence and thus do not as accurately correct loss and interference of the channel.

CONCLUSION

Many signals transmitted today are colored. The more colored a signal, the less accurately current DFEs may equalize that signal. This document describes tools capable of improving the accuracy of decision feedback equalization (DFE) for colored signals, including those colored by having unequally distributed patterns. By so doing the tools improve the accuracy of data transfer or reduce the cost of data transfer, especially for systems and protocols having high data-transmission rates.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims

What is claimed is:

1. A method comprising:
   receiving, via a channel, signals representing respective bit patterns of a discrete set of multiple possible bit patterns capable of being received via the channel, the signal having amplitude loss across frequencies of a frequency band of the signal or interference caused when the signal passed through the channel, the receiving performed until signals representing each of the multiple possible bit patterns are received;
   determining, for the signals received, which bit patterns represented by respective ones of the signals have been used to adjust one or more equalizing coefficients a predetermined number of times and which other bit patterns represented by respective others of the signals have not been used to adjust the one or more equalizing coefficients the predetermined number of times;
  disregarding the respective signals responsive to determining that the bit pattern represented by the respective signals have been previously used to adjust the one or more equalizing coefficients; and
  adjusting, based on the other bit patterns, the one or more equalizing coefficients responsive to determining that the other bit patterns represented by the respective other signals have not been used to adjust the one or more equalizing coefficients the predetermined number of times.

2. The method as recited in claim 1, further comprising adjusting the one or more equalizing coefficients using all of the bit patterns of the multiple possible bit patterns.

3. The method as recited in claim 1, wherein the discrete set is dictated by a protocol requiring run-length limited bit patterns, idle bit patterns, or special code-word bit patterns.

4. The method as recited in claim 1, wherein the predetermined number of times is 1 and the predetermined number of times resets to 0 responsive to the respective signals and respective other signals representing all multiple possible bit patterns being used once to adjust the one or more equalizing coefficients.

5. The method as recited in claim 1, further comprising, responsive to the act of adjusting the one or more equalizing coefficients, correcting, based on the one or more equalizing coefficients, the amplitude loss or the interference of at least one of the signals.

6. The method of claim 5, wherein the amplitude loss comprises unequal amplitude loss and the interference comprises inter-symbol interference and the act of correcting corrects both the amplitude loss and the interference.

7. The method as recited in claim 1, further comprising weighting more-recently received signals more-heavily than less-recently received signals when adjusting the one or more equalizing coefficients.

8. An apparatus comprising: one or more processor; one or more computer-readable hardware storage device storing processor-executable instructions that, responsive to execution by the one or more processors, implement a decision feedback equalization (DFE) engine to:
  receive, via a channel, signals representing respective bit patterns of a discrete set of multiple possible bit patterns capable of being received via the channel, the signal having amplitude loss across frequencies of a frequency band of the signal or interference caused when the signal passed through the channel, the receiving performed until signals representing each of the multiple possible bit patterns are received;
  determine, for the signals received, which bit patterns represented by respective ones of the signals have been used to adjust one or more equalizing coefficients a predetermined number of times and which other bit patterns represented by respective others of the signals have not been used to adjust the one or more equalizing coefficients the predetermined number of times;
  disregard the respective signals responsive to determining that the bit patterns represented by the respective signals have been used to adjust the one or more equalizing coefficients the predetermined number of time, and
  adjust, based on the other bit patterns, the one or more equalizing coefficients responsive to determining that the other bit patterns represented by the respective other signals have not been used to adjust the one or more equalizing coefficients the predetermined number of times.

9. The apparatus as recited in claim 8, wherein the DFE engine is further implemented to treat the bit patterns of the discrete set of multiple possible bit patterns as not having been used after all of the bit patterns have been used the predetermined number of times.

10. The apparatus as recited in claim 8, wherein the discrete set is dictated by a protocol requiring run-length limited bit patterns, idle bit patterns, or special code-word bit patterns.

11. The apparatus as recited in claim 8, wherein the predetermined number of times is 1 and the predetermined number of times resets, in a record comprised by or accessible by the DFE engine, to 0 responsive to the signal and other signals representing all multiple possible bit patterns being used once to adjust the one or more equalizing coefficients.

12. The apparatus as recited in claim 8, wherein the amplitude loss comprises unequal amplitude loss and the interference comprises inter-symbol interference.

13. The apparatus as recited in claim 8, wherein the DFE engine is further implemented to correct, based on the one or more equalizing coefficients, the amplitude loss or the interference of the signal.

14. One or more computer-readable hardware storage devices comprising processor-executable instructions that, responsive to execution by a processor, implement an equalization engine to:
  receive, via a channel, signals representing respective bit patterns of a discrete set of multiple possible bit patterns capable of being received via the channel, the signals having amplitude loss across frequencies of a frequency band of the signal or interference caused when the signal passed through the channel, the receiving performed until signals representing each of the multiple possible bit patterns are received;
  determine, for the signals received, which bit patterns represented by respective ones of the signals have been used to adjust one or more equalizing coefficients a predetermined number of times and which other bit patterns represented by respective others of the signals have not been used to adjust the one or more equalizing coefficients the predetermined number of times;
  adjust, based on the other bit patterns, the one or more equalizing coefficients responsive to determining that the other bit patterns represented by the respective other signals have not been used to adjust the one or more equalizing coefficients the predetermined number of times; and
  correct, based on the adjusted one or more equalizing coefficients, the amplitude loss or the interference of the signal.

15. The computer-readable hardware storage devices as recited in claim 14, wherein the equalization engine is further implemented to disregard the respective signals responsive to determining that the bit patterns represented by the respective signals have been used previously to adjust the one or more equalization coefficients.

16. The computer-readable hardware storage devices as recited in claim 14, wherein the engine is further configured to treat the bit patterns of the discrete set of multiple possible bit patterns as not having been used after all of the bit patterns have been used the predetermined number of times.

17. The computer-readable hardware storage devices as recited in claim 14, wherein the discrete set is dictated by a protocol requiring run-length limited bit patterns, idle bit patterns, or special code-word bit patterns.

18. The computer-readable hardware storage devices as recited in claim 14, wherein the equalization engine is further implemented to record in a data structure that the bit pattern was used responsive to the act of adjusting the one or more equalizing coefficients based on the bit pattern.

19. The computer-readable hardware storage devices as recited in claim 14, wherein the amplitude loss comprises unequal amplitude loss and the interference comprises inter-symbol interference and the act of correcting corrects the amplitude loss or the interference.

20. The computer-readable hardware storage devices as recited in claim 14, wherein the equalization engine is further configured to weigh more-recently received signals more-heavily than less-recently received signals when adjusting the one or more equalizing coefficients.

\* \* \* \* \*